United States Patent

Kobayashi et al.

[11] Patent Number: 6,028,284
[45] Date of Patent: Feb. 22, 2000

[54] ELECTROMAGNETIC RELAY STRUCTURE AND SPOT WELDING MACHINE USED FOR FABRICATING SAME

[75] Inventors: Shigeru Kobayashi; Kazuo Ohtsuka; Nobuo Ishibashi, all of Tokyo, Japan

[73] Assignee: Niles Parts Co., Ltd., Japan

[21] Appl. No.: 09/136,519

[22] Filed: Aug. 19, 1998

Related U.S. Application Data

[62] Division of application No. 08/772,898, Dec. 24, 1998, Pat. No. 5,874,875.

[30] Foreign Application Priority Data

Dec. 28, 1995 [JP] Japan ................................ 7-353039

[51] Int. Cl.[7] ........................................................ B23K 9/12
[52] U.S. Cl. ..................................... 219/80; 219/86.1
[58] Field of Search ................................ 219/80, 81, 82, 219/84, 86, 86.1, 86.23, 86.24, 86.25

[56] References Cited

U.S. PATENT DOCUMENTS 2,337,037 12/1943 Fentress ...................................... 219/80
3,270,180 8/1966 Morley et al. ........................... 219/86.1
5,552,573 9/1996 Okita et al. ............................. 219/118

*Primary Examiner*—Lincoln Donovan
*Attorney, Agent, or Firm*—Rader, Fishman & Grauer; Ronald P. Kananen

[57] ABSTRACT

An electromagnetic relay structure having a plate spring and a yoke secured to a base by forming a vibration damping portion integral with a terminal and by securing the terminal to the base by insertion molding. The vibration damping portion is disposed between an L-shaped yoke, an end of which is secured to the base, and the terminal, which is also fixed to the base. The vibration damping portion is spot welded to a plate spring, which is secured to the yoke. A spot welding machine is provided for fixing the plate spring to the vibration damping portion. The spot welding machine has electrodes that are rotated by motors while effecting spot welding of the material.

10 Claims, 4 Drawing Sheets

ELECTROMAGNETIC RELAY STRUCTURE AND SPOT WELDING MACHINE USED FOR FABRICATING SAME

This application is a divisional of application Ser. No. 08/772,898 filed Dec. 24, 1998 now U.S. Pat. No. 5,874,975.

BACKGROUND OF THE INVENTION

1. Field of the Invention

The present invention relates generally to electromagnetic relays and spot welding machines and, in particular, to a structure of an electromagnetic relay, in which a terminal having a vibration damping function is secured by spot welding to a plate spring fixed to a yoke and the terminal is secured to a base by insertion molding, and a spot welding machine for fixing the plate spring to a vibration damping portion of the terminal by spot welding.

2. Description of the Prior Art

A conventional technique for securing terminals and a yoke to a base of an electromagnetic relay is disclosed, for example, in Japanese Utility Model A-Sho 61-167349. The electromagnetic relay made by this conventional technique has terminals and an end of an L-shaped yoke secured to a base by insertion molding with resin. One end of the yoke is secured to the base, and a plate spring having an armature is fixed to the other end of the yoke by means of screws. A vibration damping plate is disposed between the yoke and the terminal so that the yoke has a vibration damping structure. One end of the vibration damping plate is fixed to the yoke by means of screws, and the other end of the vibration damping plate is soldered to one of the terminals.

However, in the prior art electromagnetic relay, since the vibration damping plate and the terminal were separate members, the number of parts and the number of mounting steps were increased, which gave rise to increased costs.

Further, since the vibration damping plate was secured to the terminal by soldering, an assembly process was difficult. In addition, since the vibration damping plate was secured to the yoke by means of screws, there was a further problem created by an increased number of parts.

On the other hand, a conventional spot welding machine is known which includes a fixed lower electrode and a movable upper electrode. Materials to be joined by spot welding with the conventional welding machine are placed on the fixed lower electrode, and electric resistance welding is effected while applying a pressure to the spot welding materials by means of the upper electrode, which is movable upward and downward. The extremities of the two electrodes are flat. The electrodes are formed approximately in the shape of a frustum with a welding point on a center line of the electrodes.

In the prior art spot welding machine, since the upper electrode was movable only upward and downward and the extremities of the electrodes were formed approximately in the shape of a frustum with the welding point on the center line thereof, welding defects were produced which caused weak welds allowing welded materials to be separated.

SUMMARY OF THE INVENTION

An object of the present invention is to provide an electromagnetic relay structure which solves the problems of the prior art structure described above.

A further object of the present invention is to provide a structure of an electromagnetic relay, in which the yoke is held solid so that resistance against vibration and shock is increased by making the terminal and the vibration damping portion in one body and by holding the vibration damping portion by a rib.

A still further object of the present invention is to provide a spot welding machine which solves the problems of the prior art spot welding machine described above.

A still further object of the present invention is to provide a spot welding machine that spot welds materials solidly by using electrodes wherein a half of each of the end surfaces of the electrodes is approximately in an arc-shape in cross-section, and spot welding is effected by rotating the electrodes.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In order to achieve the above objects, an electromagnetic relay structure according to the present invention comprises a vibration damping portion serving as a conductive path between an L-shaped yoke, an end of which is secured to a base, and a terminal fixed to the base, wherein the terminal and the vibration damping portion are made in one body, and the terminal is secured to the base by insertion molding.

A rib is preferably provided for preventing the vibration damping portion protruding from a base surface of the base from being bent and vibrated. The rib is preferably integral with the base. The terminal is preferably secured to a plate spring by spot welding. An upper extremity of the plate spring is fixed to the yoke. The terminal and the plate spring are preferably spot-welded with rotating electrodes of a spot welding machine.

In accordance with another aspect of the present invention, the above objects are achieved by a spot welding machine in which spot welding is effected while rotating electrodes by means of motors or the like. The electrodes can be rotated with a reduced speed obtained by reducing a rotational speed of the motors through reducing mechanisms. The reducing mechanisms may be reducing gear mechanisms, each of which is located between a respective one of the motors and a toothed-wheel disposed on the electrode.

The electrodes of the spot welding machine are preferably shaped such that a half of each of the end surfaces of the electrodes, which are contacted with a spot welding material with pressure, is formed approximately in an arc-shape in cross-section.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENTS

Figure 1:
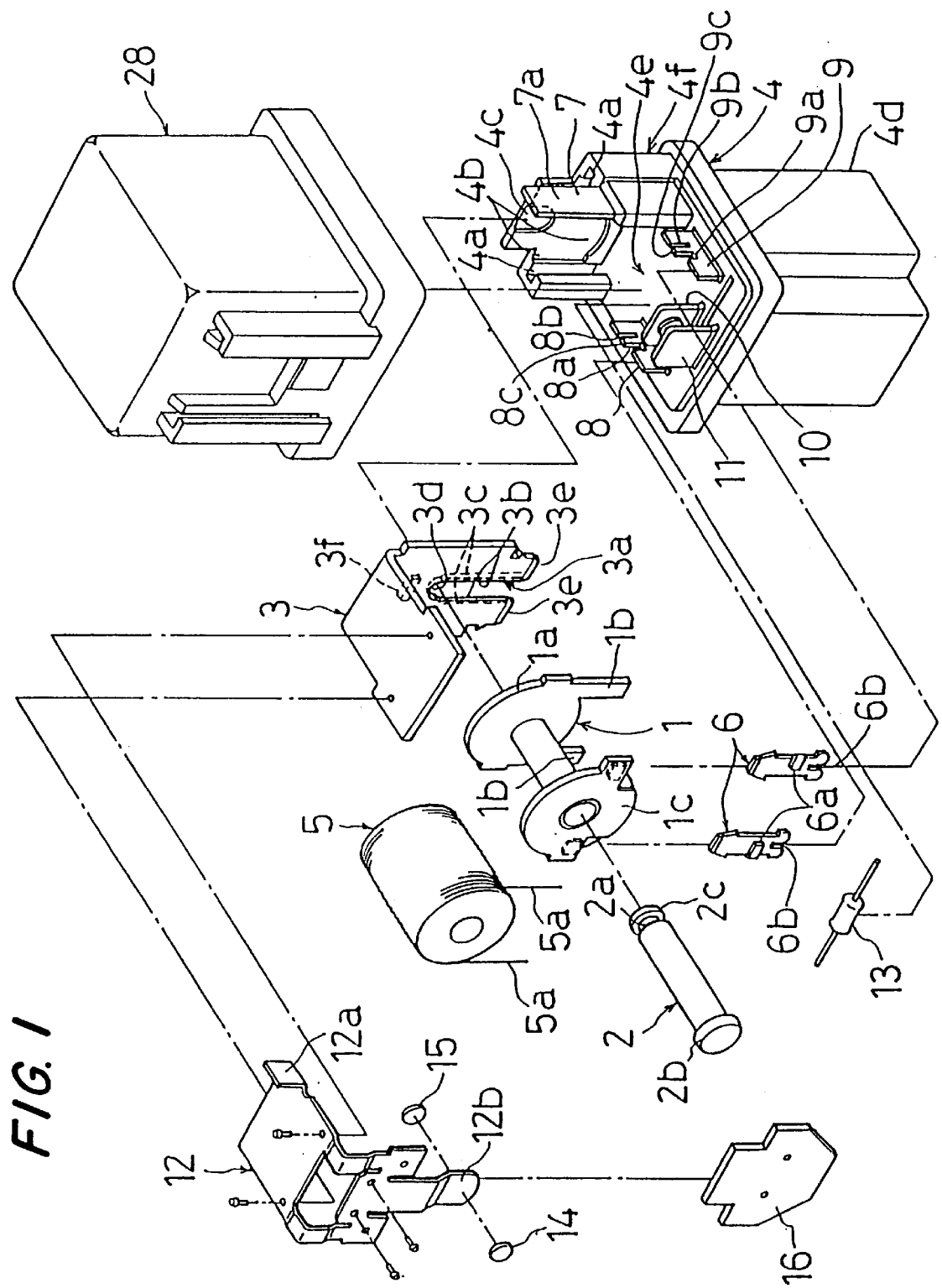
FIG. 1 is an exploded perspective view of a preferred embodiment of an electromagnetic relay structure according to the present invention.
Figure 2:
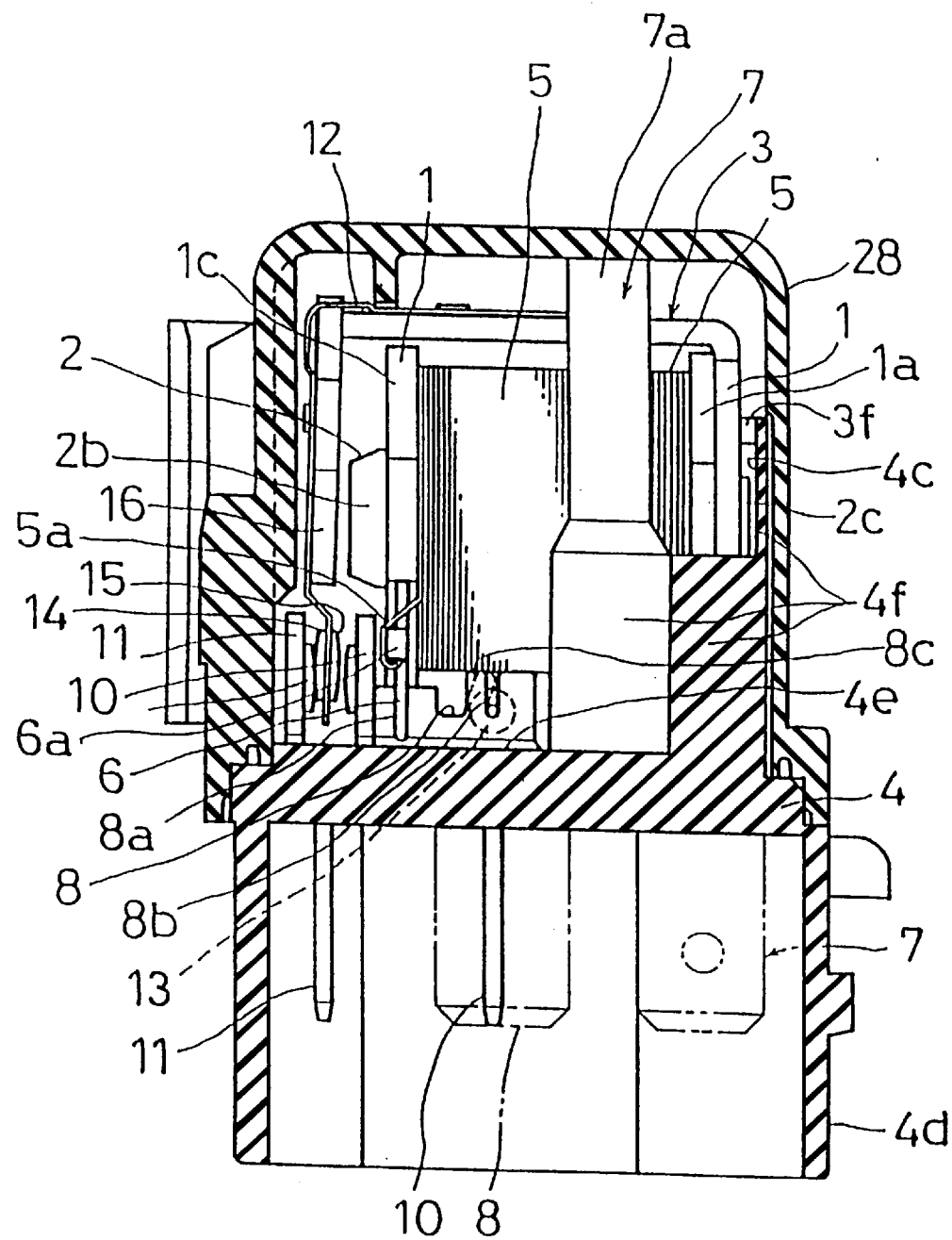
FIG. 2 is an enlarged cross-sectional front view of the preferred embodiment of the electromagnetic relay structure according to the present invention.

Preferred embodiments of an electromagnetic relay structure and a spot welding machine according to the present invention will now be described with reference to FIGS. 1 to 4 of the accompanying drawings.

An electromagnetic relay structure according to the present invention includes a coil 5 wound around a bobbin 1, through which an iron core 2 is inserted. Two rams 1b protrude from both sides of a lower end of a first flange 1a of the bobbin 1. Two coil terminals 6 are inserted into both sides of a lower end of a second flange 1c with pressure. The bobbin 1 is secured to a base 4 by inserting the rams 1b into first insertion grooves 4a with pressure, and by inserting bifurcated portions 6b of the coil terminals 6 into upper ends of terminals 8 and 9 with pressure.

A small diameter portion 2a is formed at one end portion of the iron core 2. The iron core 2 is inserted into the center of the bobbin 1. A head portion 2b is formed at the other end portion of the iron core 2. The iron core 2 and the bobbin 1 are secured to the yoke 3 by inserting the small diameter portion 2a of the iron core 2 into a cut-off groove 3a formed in the yoke 3 with pressure. A dish portion 2c is formed at the extremity portion of the iron core 2 by forming the small diameter portion 2a therein. The dish portion 2c is inserted into a U-shaped cut-off groove 4c formed in the base 4 by mounting the bobbin 1 on the base 4 by insertion.

Figure 3:
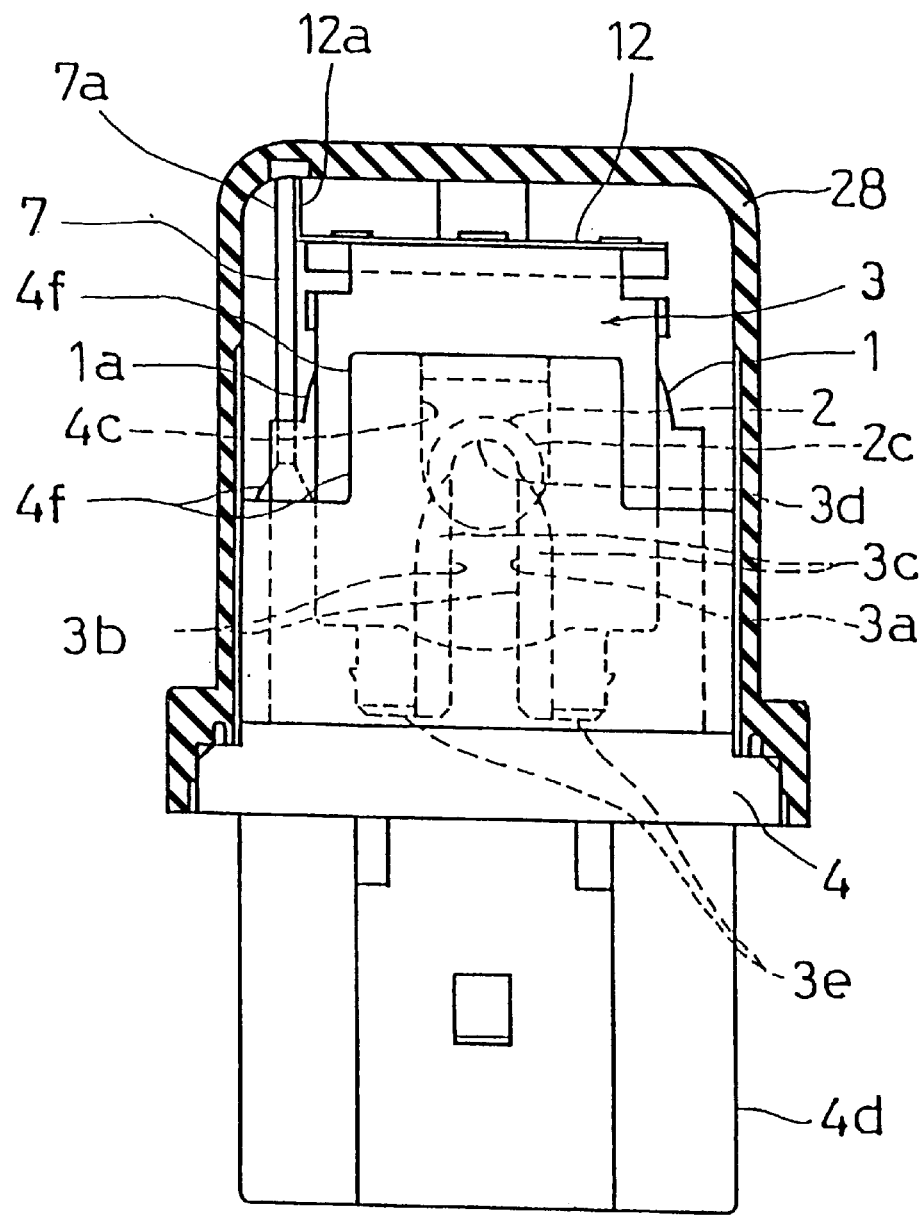
FIG. 3 is an enlarged cross-sectional side view of the preferred embodiment of the electromagnetic relay structure according to the present invention.

The yoke 3 consists of an approximately L-shaped conductive plate member. One end of the yoke 3 forms tongue-shaped pieces 3e. A plate spring 12 consisting of a conductive thin plate member is secured to the other end of the yoke 3 by means of screws. As indicated in FIGS. 1 and 3, the cut-off groove 3a is formed by cutting a U-shaped section out of the yoke 3. Tapered surfaces 3c are formed in the outer surface portions of the yoke 3 opposite to each other. The bottom end 3d of the U-shaped cut-off groove 3a is formed in a semicircular shape. As indicated in FIGS. 1 and 3, the tapered surfaces 3c are formed in an arc-shape on the side of the bottom end 3d.

The two tongue-shaped pieces 3e are formed in the yoke 3 by forming the cut-off groove 3a by cutting. A sealing protrusion 3f, which is to be inserted into the upper opening end of the U-shaped cut-off groove 4c, is formed on the outer side surface over the cut-off groove 3a. The outer lower end portion of each of the tongue-shaped pieces 3e is formed in a saw-toothed shape. The tongue-shaped pieces 3e are inserted into a second insertion groove 4b formed in the base 4 with pressure. When the tongue-shaped pieces 3e are inserted into the second insertion groove 4b with pressure, the sealing protrusion 3f of the yoke 3 is inserted into the U-shaped cut-off groove 4c.

Terminals 7, 8, 9, 10 and 11 are formed on the base 4 by insertion molding. A rib 4f, which prevents bending or vibration of the vibration damping portion 7a of the terminal 7 protruding from the base surface 4e, is formed integral with the base 4. The rib 4f is a wall-like protrusion having an approximately rectangular shape open on one side. The first insertion groove 4a, the second insertion groove 4b, and the U-shaped cut-off groove 4c are formed in the inner surface portion of the rib 4f. An end portion 5a of the coil 5 wound around the bobbin 1 is wound around a protruding piece 6a of a coil terminal 6 to form an electronic connection.

One end of each of the coil terminals 6 is secured to each end portion of the flange 1c of the bobbin 1. The bifurcation portion 6b at the other end of each of the coil terminals 6 is inserted into the upper end portion of each of the terminals 8 and 9. The protruding pieces 6a protrude from an approximately central portion of each of the coil terminals 6. The protruding pieces 6a each has one of the terminal portions 5a of the coil 5 wound therearound. The protruding pieces 6a are then bent with the terminal portions 5a wound therearound.

The upper ends of the terminals 7, 8, 9, 10 and 11 protrude from the base surface 4e of the base 4, and the other ends thereof protrude within a connector. The terminal 7 is formed integral with the vibration damping portion 7a protruding from the base 4.

The vibration damping portion 7a serves as a conductive path for electrically connecting the plate spring 12, one end of which is secured to the yoke 3, with the terminal 7 secured to the base 4. The vibration damping portion 7a also serves as a member for holding the yoke 3 against vibration. The terminal 7 is fixed to a connecting piece 12a of the plate spring 12, the upper end of which is secured to the yoke 3 by spot welding.

The terminals 8 and 9 each have a splitting groove 8a and 9a, a splitting groove 8b and 9b, and a tongue-shaped piece 8c and 9c. The splitting grooves 8b and 9b receive leads of an electronic element, which are inserted into the grooves with pressure. The leads of the electronic element are bent around the tongue-shaped pieces 8c and 9c for securing the leads in place. The terminals 10 and 11 protrude from the base surface 4e and are juxtaposed so as to be opposite to each other. Movable contacts 14 and 15 are secured to a working piece 12b of the plate spring 12 and are disposed between the terminals 10 and 11. The plate spring 12 consists of a conductive thin plate, which is fixed to the yoke 3 by means of screws. An armature 16 is secured to the plate spring 12 by means of screws.

The electronic element 13 is a resistor or the like having leads on both ends thereof. The movable contacts 14 and 15 are drum-shaped contact materials, which are secured to the plate spring 12 by welding or caulking. The armature 16 is a plate member made of iron, which is secured to the plate spring 12 by means of screws. Reference numeral 28 represents a case, into which the base is inserted and which is hermetically closed by ultrasonic welding or the like.

A spot welding machine and process for securing the connecting piece 12a to the vibration damping portion 7a by spot welding will now be explained with reference to FIG. 4.

Figure 4:
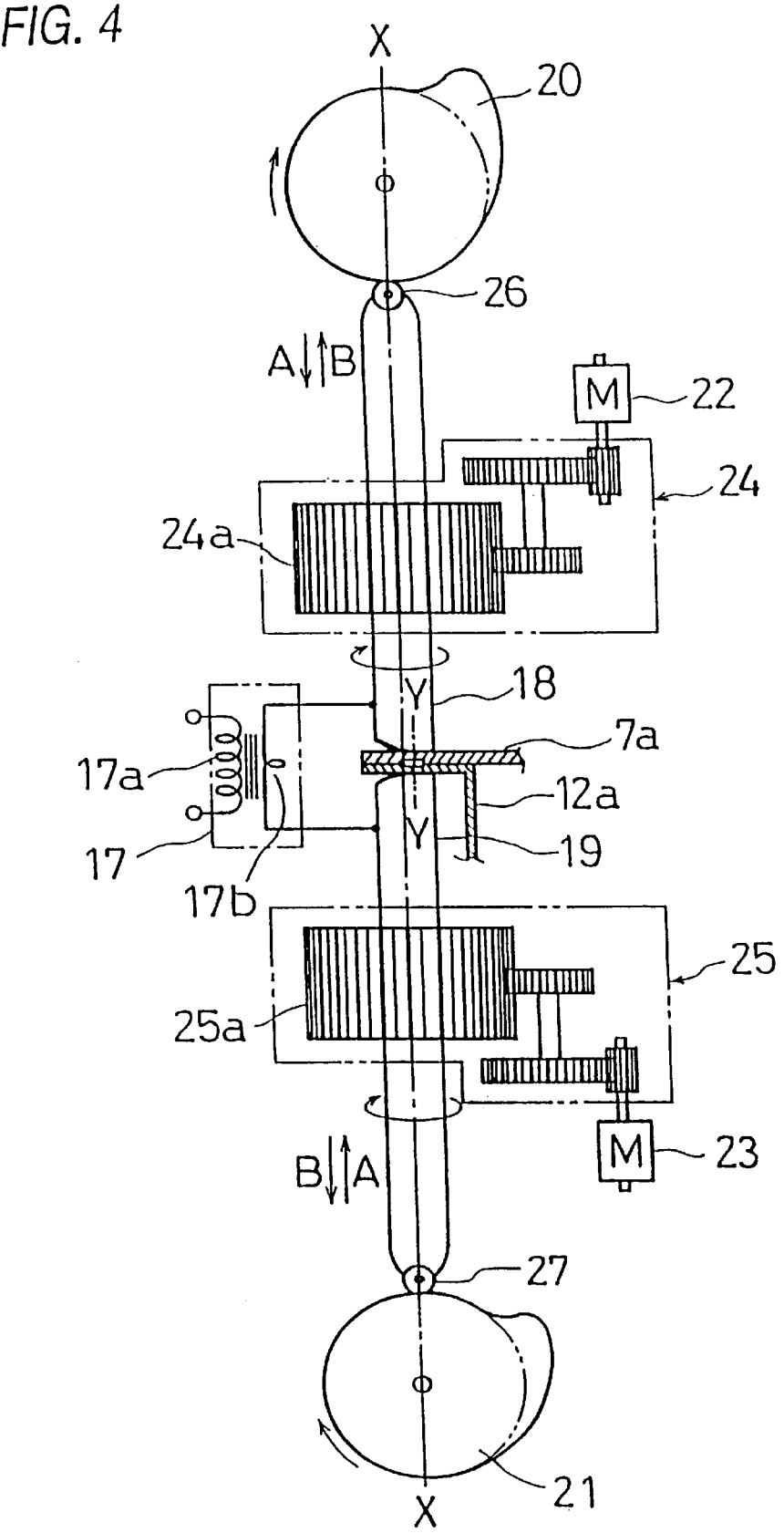
FIG. 4 is a diagram for explaining a spot welding machine according to the present invention.

In FIG. 4, reference numeral 17 represents a transformer. A primary coil 17a is connected with a welding power supply (not indicated in the figure) and a secondary coil 17b is connected with electrodes 18 and 19. As indicated in FIG. 4, a half of each of the end surfaces of the electrodes 18 and 19 on the side contacted with the vibration damping portion 7a and the connecting piece 12a with pressure is formed approximately in an arc-shape in cross-section. Rollers 26 and 27 are mounted rotatably on the other ends of the electrodes 18 and 19, and toothed-wheels 24a and 25a are secured to the central portions of the electrodes 18 and 19, respectively. The center line Y—Y passing through a welding point of the electrodes 18 and 19 is deviated from the center line X—X (i.e. longitudinal axis) of the electrodes 18 and 19. The electrodes 18 and 19 rise and descend along their longitudinal axis X—X in the directions indicated by arrows A and B. The electrodes 18 and 19 are rotated about their longitudinal axis X—X by motors 22 and 23 with a reduced speed through reduction mechanisms 24 and 25 consisting of toothed wheels 24a and 25a or the like, respectively.

Pressing cams 20 and 21 are rotated by motors (not indicated in the figure) through reduction gears (not indicated in the figure), for example, similar to the reduction mechanisms 24 and 25 as well as the motors 22 and 23 to raise and lower the electrodes 18 and 19. Further means for rotating the pressing cams 20 and 21 may be human means using hands or legs, or electric means, such as the motors 22 and 23, or the like. The motors 22 and 23 rotate the electrodes 18 and 19, respectively, through the reduction mechanisms 24 and 25. Alternatively, the motors 22 and 23 may rotate the electrodes 18 and 19 directly with a low speed without using the reduction mechanisms 24 and 25.

The reduction mechanisms 24 and 25 transmit rotation of the motors 22 and 23 to the electrodes 18 and 19, respectively, while reducing the speed of the rotation using suitable reduction gear mechanisms or the like. The reduction mechanisms 24 and 25 are not restricted to the toothed-wheels 24a and 25a, but instead may comprise other suitable reducing means such as, for example, a belt and a wheel or the like.

The rollers 26 and 27 are brought into contact with cam surfaces of the pressing cams 20 and 21 with pressure and, when the pressing cams 20 and 21 rotate, the electrodes 18 and 19 rise and descend.

The effects of the present invention constructed as described above will now be described in detail together with the mounting procedure therefor.

The terminals 7, 8, 9, 10 and 11 are fixed to the base 4 by insertion molding. Since the terminal 7 is formed integral with the vibration damping portion 7a, the number of parts and the number of mounting steps can be reduced. The leads of the two extremities of the electronic element 13 are inserted into the splitting grooves 8b and 9b with pressure, respectively. The coil 5 is wound around the bobbin 1. The coil terminals 6 are inserted into the bobbin 1. Each of the end portions 5a of the coil is wound around each protruding piece 6a and the protruding piece 6a is then bent approximately 180° over the face of the respective coil terminal 6. The rams 1b of the bobbin 1 are inserted into the first insertion grooves 4a with pressure and, at the same time, the coil terminals 6 are inserted into the upper ends of the terminals 8 and 9, respectively, so that the bobbin is secured to the base 4.

The movable contacts 14 and 15 are welded to the plate spring 12. The yoke 3 and the armature 16 are fixed by means of screws. The iron core 2 is inserted into the through hole of the bobbin 1. The tongue-shaped pieces 3e are inserted into the second insertion grooves 4b and, at the same time, the small diameter portion 2a is inserted into the cut-off groove 3a with pressure, until the small diameter portion 2a reaches the bottom end 3d.

The connecting piece 12a is secured to the vibration damping portion 7a by spot welding. When the spot welding is effected, as indicated in FIG. 4, at first the welding power supply is switched-on and the vibration damping portion 7a and the connecting piece 12a are put between the electrodes 18 and 19. The motors 22 and 23 rotate the electrodes 18 and 19 with a reduced speed through the reduction mechanisms 24 and 25, respectively. The pressing cams 20 and 21 rotate to move the electrodes 18 and 19 in the directions indicated by the arrows A so that a pressure is applied to the vibration damping portion 7a and the connecting piece 12a by the electrodes 18 and 19.

Parts to be welded of the vibration damping portion 7a and the connecting piece 12a are melted easily so that they are rigidly welded, owing to the fact that the electrodes 18 and 19 are rotated and a pressure is applied thereto by the pressing cams 18 and 19. It is possible to obtain a good spot-welded part of the spot welding materials by means of the electrodes 18 and 19, owing to the fact that a half of each of the end surfaces of the electrodes pressing the spot welding materials is formed approximately in an arc-shape in cross-section.

The plate spring 12 is secured to the yoke 3 by means of screws. The connecting piece 12a is fixed to the vibration damping portion 7a by spot welding. In this way the terminal 7 is connected electrically with the movable contact 14 or 15 and, at the same time, the plate spring 12 and the yoke 3 can be joined rigidly. Since the vibration damping portion 7a of the terminal 7 is held by the rib 4f protruding from the base surface 4e having an approximately rectangular shape open on one side, resistances against shock and vibration can be obtained, and neither bending nor vibration takes place.

As a result of the present invention being constructed as described above, the following effects can be obtained.

(1) An electromagnetic relay is provided in which there is disposed a vibration damping portion serving as a conductive path in common between an L-shaped yoke, one end of which is secured to a base, and a terminal secured to the base by insertion molding. It is therefore possible to decrease the number of parts and the number of mounting steps, and also to further improve the vibration damping properties of the yoke.

(2) The vibration damping portion can be secured rigidly to the base, owing to the fact that the vibration damping portion protruding from the base surface of the base is formed in one body with a rib for preventing bending and vibration of the vibration damping portion.

(3) The vibration damping portion can be secured rigidly to the yoke, owing to the fact that the terminal is secured to the plate spring by spot welding, and the upper end of the plate spring is fixed to the yoke.

(4) The vibration damping portion and the plate spring can be welded surely, owing to the fact that the terminal and the plate spring are joined by spot welding.

(5) A spot welding machine is provided wherein spot welding is effected while rotating the electrodes by means of motors or the like. The welding materials are thereby melted easily, and materials can be joined more rigidly by the spot welding process.

(6) It is possible to join the welding materials rigidly by spot welding while rotating the electrodes with a suitable rotational speed, owing to the fact that rotation of the motors is transmitted to the electrodes through reduction mechanisms.

(7) The electrodes can be rotated with a low speed by the reduction mechanisms, which are reduction gear mechanisms interposed between toothed-wheels disposed on the electrodes and the motors.

(8) It is possible to obtain a good spot-welded part of the spot welding materials, owing to the fact that half of each of the end surfaces of the electrodes pressing the spot welding materials is formed approximately in an arc-shape in cross-section.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A spot welding machine, comprising:

a pair of electrodes each having a longitudinal axis and an end surface for engaging a material to be spot welded, said electrodes being axially movable along said longitudinal axis such that said end surfaces can be moved toward and away from each other; and means for rotating said electrodes about said longitudinal axis such that spot welding can be effected between said end surfaces of said electrodes while rotating said electrodes.

2. The spot welding machine according to claim 1, further comprising reducing mechanisms associated with each of said rotating means, said reducing mechanisms being operable to cause said rotating means to rotate said electrodes with a reduced rotational speed.

3. The spot welding machine according to claim 2, wherein said rotating means comprises motors associated with each of said electrodes, and said reducing mechanisms are reducing gear mechanisms, each of which is located between a respective one of the motors and a toothed-wheel disposed on a respective one of said electrodes.

4. The spot welding machine according to claim 3, wherein a first half of each of said end surfaces of said electrodes is approximately in an arc-shape in cross-section as viewed in a direction normal to said longitudinal axis, and a second half of each of said end surfaces of said electrodes is approximately flat in cross-section as viewed in said direction.

5. The spot welding machine according to claim 2, wherein a first half of each of said end surfaces of said electrodes is approximately in an arc-shape in cross-section as viewed in a direction normal to said longitudinal axis, and a second half of each of said end surfaces of said electrodes is approximately flat in cross-section as viewed in said direction.

6. The spot welding machine according to claim 1, wherein a first half of each of said end surfaces of said electrodes is approximately in an arc-shape in cross-section as viewed in a direction normal to said longitudinal axis, and a second half of each of said end surfaces of said electrodes is approximately flat in cross-section as viewed in said direction.

7. The spot welding machine according to claim 1, wherein said end surfaces are generally arc-shaped in cross-section as viewed in a direction normal to said longitudinal axis.

8. A spot welding machine, comprising:

first and second electrodes having respective end surfaces for engaging opposite sides of a material to be joined by spot-welding;

means for moving said first and second electrodes along a longitudinal axis in a direction toward and away from the material to be joined; and means for rotating said first and second electrodes about said longitudinal axis relative to the material to be joined while effecting spot welding of the material.

9. The spot welding machine according to claim 8, wherein said end surfaces of said electrodes are generally arc-shaped in cross-section as viewed in a direction normal to said longitudinal axis.

10. A method of assembling an electromagnetic relay, comprising the steps of:

providing an electromagnetic relay case having a vibration damping portion formed therein, and a plate spring having a connecting portion;

placing the vibration damping portion and the connecting portion in engagement with each other between first and second electrodes having respective end surfaces;

moving said first and second electrodes along a longitudinal axis toward each other so that the end surfaces engage the vibration damping portion and the connecting portion; and rotating said first and second electrodes about said longitudinal axis while effecting spot welding of the connecting portion to the vibration damping portion.

* * * * *

UNITED STATES PATENT AND TRADEMARK OFFICE
CERTIFICATE OF CORRECTION

PATENT NO.    : 6,028,284
DATED         : February 22, 2000
INVENTOR(S)   : Kobayashi et al.

It is certified that error appears in the above-identified patent and that said Letters Patent is hereby corrected as shown below:

<u>Title page,</u>
Item [62], Related U.S. Application Data, should read: -- [62] Division of application No. 08/772,898, Dec. 24, 1996, Pat. No. 5,874,875. --

Signed and Sealed this

Tenth Day of December, 2002

JAMES E. ROGAN
*Director of the United States Patent and Trademark Office*